United States Patent
Schaeffer et al.

(10) Patent No.: US 11,739,646 B1
(45) Date of Patent: Aug. 29, 2023

(54) PRE-SINTERED PREFORM BALL FOR BALL-CHUTE WITH HOLLOW MEMBER THEREIN FOR INTERNAL COOLING OF TURBINE COMPONENT

(71) Applicant: General Electric Company, Schenectady, NY (US)

(72) Inventors: Ethan Conrad Schaeffer, Greenville, SC (US); Weston Suchenski, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/657,414

(22) Filed: Mar. 31, 2022

(51) Int. Cl.
*F01D 25/12* (2006.01)
*F01D 5/18* (2006.01)

(52) U.S. Cl.
CPC ............. *F01D 5/18* (2013.01); *F01D 25/12* (2013.01); *F05D 2230/60* (2013.01); *F05D 2240/12* (2013.01); *F05D 2240/30* (2013.01); *F05D 2260/20* (2013.01)

(58) Field of Classification Search
CPC ........ F01D 5/18; F01D 25/12; F05D 2230/60; F05D 2240/12; F05D 2240/30; F05D 2260/20
See application file for complete search history.

(56) References Cited

U.S. PATENT DOCUMENTS

| | | |
|---|---|---|
| 4,185,369 A | 1/1980 | Darrow et al. |
| 4,249,291 A | 2/1981 | Grondahl et al. |
| 6,340,047 B1 * | 1/2002 | Frey .......... B22C 21/14 164/137 |
| 6,422,817 B1 * | 7/2002 | Jacala .......... F02C 7/18 415/114 |
| 6,929,825 B2 * | 8/2005 | Wustman ........ F01D 5/288 427/237 |
| 6,966,756 B2 | 11/2005 | McGrath et al. |

(Continued)

FOREIGN PATENT DOCUMENTS

| EP | 1205639 A1 | 5/2002 |
|---|---|---|
| EP | 2230381 A2 | 9/2010 |

OTHER PUBLICATIONS

EP Search Report dated May 31, 2023 for Application No. 23161400.9; pp. 10.

*Primary Examiner* — David E Sosnowski
*Assistant Examiner* — Theodore C Ribadeneyra
(74) *Attorney, Agent, or Firm* — James Pemrick; Charlotte Wilson; Hoffman Warnick LLC (57) ABSTRACT

A ball for a ball-chute in a turbine component, the turbine component, and a method of using the ball, are provided. A ball may include a ball body made of a pre-sintered preform (PSP) material. The ball body has an opening defined therethrough having a first cross-sectional area. A hollow member is fixed within the opening defined through the ball body. The hollow member has a second cross-sectional area smaller than the first cross-sectional area of the opening, and is made of a material having a melt temperature higher than a melt temperature of the PSP material. The method includes positioning the ball and brazing the ball in place. The hollow member maintains fluid communication through the ball after the brazing, and allows customized metering of the coolant flow therethrough.

17 Claims, 4 Drawing Sheets

(56) References Cited

U.S. PATENT DOCUMENTS

| | | | |
|---|---|---|---|
| 7,216,694 B2 * | 5/2007 | Otero | B22C 9/04 |
| | | | 164/369 |
| 7,674,093 B2 * | 3/2010 | Lee | F01D 5/187 |
| | | | 164/369 |
| 8,454,301 B1 * | 6/2013 | Liang | F01D 5/187 |
| | | | 416/97 R |
| 10,006,293 B1 | 6/2018 | Jones | |
| 10,443,403 B2 * | 10/2019 | Dooley | B22C 7/02 |
| 2005/0152785 A1 * | 7/2005 | McGrath | F01D 5/187 |
| | | | 416/97 R |
| 2007/0036942 A1 | 2/2007 | Steele | |
| 2010/0059573 A1 | 3/2010 | Kottilingam et al. | |
| 2010/0239409 A1 | 9/2010 | Draper | |
| 2018/0161853 A1 | 6/2018 | Deines et al. | |
| 2018/0209277 A1 | 7/2018 | Dooley et al. | |
| 2019/0039133 A1 | 2/2019 | Cui et al. | |
| 2020/0222978 A1 | 7/2020 | Deines et al. | |
| 2021/0071533 A1 * | 3/2021 | Cui | F01D 5/18 |

* cited by examiner

PRE-SINTERED PREFORM BALL FOR BALL-CHUTE WITH HOLLOW MEMBER THEREIN FOR INTERNAL COOLING OF TURBINE COMPONENT

TECHNICAL FIELD

The disclosure relates generally to turbomachines, and more particularly, to a pre-sintered preform (PSP) ball with a hollow member therein for internal cooling of a turbomachine.

BACKGROUND

After a turbine component is formed, balls may be placed into one or more selected passages in the turbine component to adjust a coolant flow through the selected passages during use of the turbine component. The passages into which the balls are placed are sometimes referred to as 'ball-chutes.' The balls are placed into the ball-chutes, and brazed into place through a brazing heating cycle. The balls may block coolant flow, or they may have holes of a desired size drilled into them to allow a metered amount of coolant to flow therethrough. The passages and the location of the balls in the turbine component are becoming harder to access, making the drilling of a hole through a ball, and the provision of the customized cooling they provide, more challenging.

BRIEF DESCRIPTION

All aspects, examples and features mentioned below can be combined in any technically possible way.

An aspect of the disclosure provides a ball for a ball-chute in a turbine component, the ball comprising: a ball body made of a pre-sintered preform (PSP) material, the ball body having an opening defined therethrough having a first cross-sectional area; and a hollow member fixed within the opening defined through the ball body, the hollow member having a second cross-sectional area smaller than the first cross-sectional area of the opening, wherein the hollow member is made of a material having a melt temperature higher than a melt temperature of the PSP material.

Another aspect of the disclosure includes any of the preceding aspects, and the hollow member includes a flange extending from at least one end thereof, each flange engaging with an end of the opening to fix the hollow member in the opening.

Another aspect of the disclosure includes any of the preceding aspects, and the material of the hollow member consists of a superalloy.

An aspect of the disclosure includes a turbine component, comprising: a component body having a ball-chute therein; and a ball positioned in the ball-chute, the ball including: a ball body brazed into position in the ball-chute, the ball body made of a pre-sintered preform (PSP) material, the ball body having an opening defined therethrough having a first cross-sectional area; and a hollow member fixed within the opening defined through the ball body, the hollow member having a second cross-sectional area smaller than the first cross-sectional area of the opening, wherein the hollow member is made of a material having a melt temperature higher than a melt temperature of the PSP material.

Another aspect of the disclosure includes any of the preceding aspects, and the hollow member includes a flange extending from at least one end thereof, each flange engaging with an end of the opening to fix the hollow member in the opening.

Another aspect of the disclosure includes any of the preceding aspects, and the material of the hollow member consists of a superalloy.

Another aspect of the disclosure includes any of the preceding aspects, and the component body includes a turbine blade airfoil.

Another aspect of the disclosure includes any of the preceding aspects, and the turbine blade airfoil is in a first stage of a turbine.

An aspect of the disclosure relates to a method comprising: positioning a ball in a ball-chute in a turbine component, the ball including: a ball body made of a pre-sintered preform (PSP) material having an outer dimension configured to position the ball body in the ball-chute, the ball body having an opening defined therethrough, the opening having a first cross-sectional area; and a hollow member fixed within the opening of the ball body, the hollow member having a second cross-sectional area smaller than the first cross-sectional area of the opening; and brazing the ball body of the ball in the ball-chute, wherein the hollow member maintains fluid communication through the ball after the brazing.

Another aspect of the disclosure includes any of the preceding aspects, and the hollow member includes a flange extending from at least one end thereof, each flange engaging with an end of the opening to fix the hollow member in the opening.

Another aspect of the disclosure includes any of the preceding aspects, and the hollow member is made of a different material than the PSP material.

Another aspect of the disclosure includes any of the preceding aspects, and the material of the hollow member has a melt temperature higher than a melt temperature of the PSP material.

Another aspect of the disclosure includes any of the preceding aspects, and the material of the hollow member consists of a superalloy.

Another aspect of the disclosure includes any of the preceding aspects, and further comprising: forming the opening in the ball body; and fixing the hollow member in the opening.

Another aspect of the disclosure includes any of the preceding aspects, and the fixing the hollow member includes forming a flange extending from at least one end thereof, each flange engaging with an end of the opening to fix the hollow member in the opening.

Another aspect of the disclosure includes any of the preceding aspects, and the fixing the hollow member includes expanding the hollow member to engage with an inner surface of the opening in an interference fit.

Another aspect of the disclosure includes any of the preceding aspects, and the positioning the ball in the ball-chute includes feeding the ball along an elongated member extending through the hollow member and into the ball-chute, the elongated member positioning the ball and the hollow member to maintain fluid communication through the hollow member and along the ball-chute after the brazing.

Two or more aspects described in this disclosure, including those described in this summary section, may be combined to form implementations not specifically described herein.

The details of one or more implementations are set forth in the accompanying drawings and the description below.

Other features, objects and advantages will be apparent from the description and drawings, and from the claims.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not necessarily to scale. The drawings are intended to depict only typical aspects of the disclosure and therefore should not be considered as limiting the scope of the disclosure. In the drawings, like numbering represents like elements between the drawings.

DETAILED DESCRIPTION

As an initial matter, in order to clearly describe the subject matter of the current disclosure, it will become necessary to select certain terminology when referring to and describing relevant machine components within a turbomachine. To the extent possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through the turbine engine or, for example, the flow of air through the combustor or coolant through one of the turbine's component systems. The term "downstream" corresponds to the direction of flow of the fluid, and the term "upstream" refers to the direction opposite to the flow (i.e., the direction from which the flow originates). The terms "forward" and "aft," without any further specificity, refer to directions, with "forward" referring to the front or compressor end of the engine, and "aft" referring to the rearward section of the turbomachine.

It is often required to describe parts that are disposed at differing radial positions with regard to a center axis. The term "radial" refers to movement or position perpendicular to an axis. For example, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. The term "axial" refers to movement or position parallel to an axis. Finally, the term "circumferential" refers to movement or position around an axis. It will be appreciated that such terms may be applied in relation to the center axis of the turbine.

In addition, several descriptive terms may be used regularly herein, as described below. The terms "first", "second", and "third" may be used interchangeably to distinguish one component from another and are not intended to signify location or importance of the individual components.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components but do not preclude the presence or addition of one or more other features, integers, steps, operations, elements, components, and/or groups thereof. "Optional" or "optionally" means that the subsequently described event or circumstance may or may not occur or that the subsequently describe component or element may or may not be present, and that the description includes instances where the event occurs or the component is present and instances where it does not or is not present.

Where an element or layer is referred to as being "on," "engaged to," "connected to" or "coupled to" another element or layer, it may be directly on, engaged to, connected to, or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Embodiments of the disclosure include a ball for a ball-chute in a turbine component, the turbine component, and a method of using the ball. A ball may include a ball body made of a pre-sintered preform (PSP) material. The ball body has an opening defined therethrough having a first cross-sectional area. A hollow member is fixed within the opening defined through the ball body. The hollow member has a second cross-sectional area smaller than the first cross-sectional area of the opening, and is made of a material having a melt temperature higher than a melt temperature of the PSP material. The method includes positioning the ball and brazing the ball in place. The hollow member maintains fluid communication through the ball after the brazing. Hence, the hollow member allows the ball to be brazed into place in a ball-chute in a turbine component, yet continue fluid communication through the ball chute with the coolant flow metered by the cross-sectional area of the hollow member. The hollow member also allows customized metering of the coolant flow therethrough. Because the ball is pre-drilled and an opening for coolant flow is maintained by the hollow member during the brazing, access to the ball-chute after brazing to drill the ball is no longer necessary.

Figure 1:
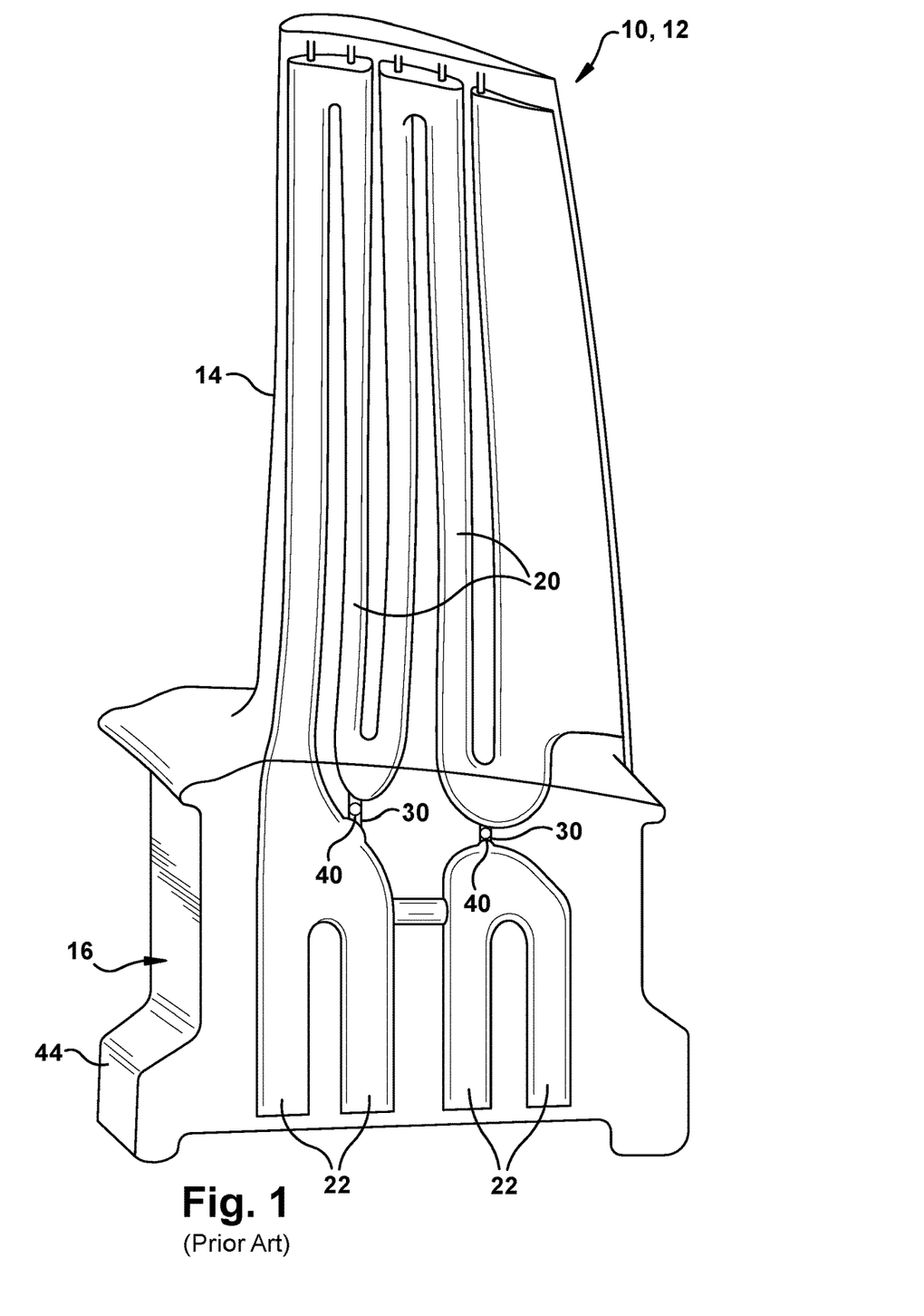
FIG. 1 shows a transparent, perspective view of an illustrative turbine component in the form of a turbine blade including a ball for a ball-chute.

With reference to FIG. 1, a transparent perspective view of an illustrative turbine component 10 in the form of a turbine blade 12 is shown. The example turbine component 10 includes an airfoil portion 14, a shank 16 and a plurality of radially extending cooling passages 20 that are supplied with a coolant, e.g., cooling air, by way of, for example, inlet cooling passages 22 that are separated in a radially inner portion of shank 16. Turbine component 10 also includes two or more ball-chutes 30, also known as "ball braze chutes." Ball-chutes 30 fluidly couple different cooling passages 20, 22. In the example shown, respective inlet passages 22 are fluidly coupled to plurality of radially extending cooling passages 20 by ball-chutes 30. The structure around ball-chutes 30 may be provided to, for example, temporarily support other features during manufacture, e.g., during additive manufacture or casting. After manufacture, ball-chutes 30 are normally plugged by solid balls 40 (sometimes referred to as "braze balls") within the passages formed by ball-chutes 30. Otherwise, the flow in cooling passages 20 would be disturbed if the coolant air was allowed to enter the circuit at these locations. Balls 40, which are typically made of braze-able steel, are positioned in ball-chutes 30 and brazed into place, i.e., using a heating cycle. Subsequently, where some metered coolant flow is determined to be desirable, openings are drilled into balls 40, e.g., through passages 20 and/or 22. Pre-drilling the openings has not heretofore been possible because the openings close during the brazing process. As noted, access to the locations of balls 40 is also becoming increasingly challenging.

Figure 2:
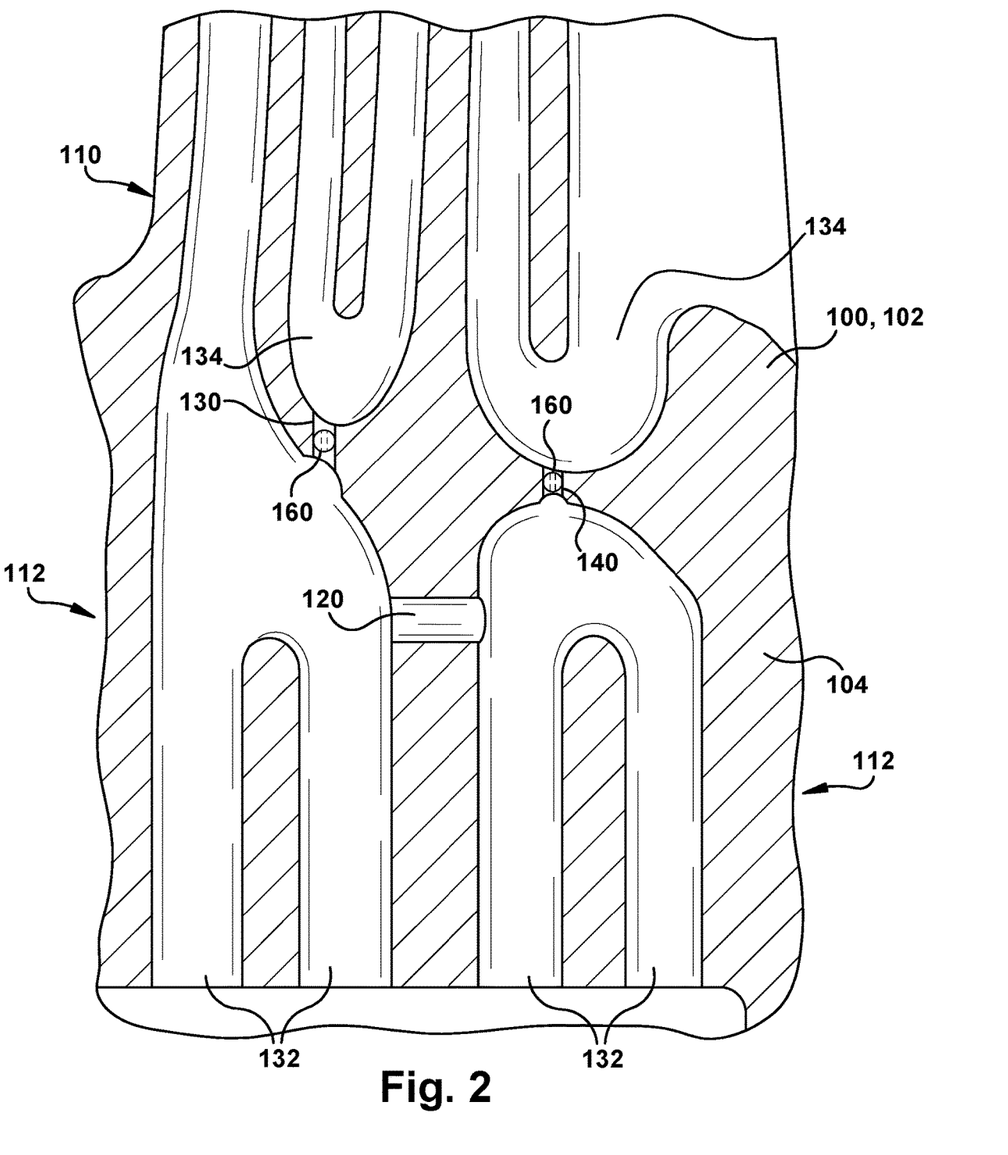
FIG. 2 shows a cross-sectional view of a turbine component with a pre-sintered preform (PSP) ball in a ball-chute, according to embodiments of the disclosure.
Figure 3:
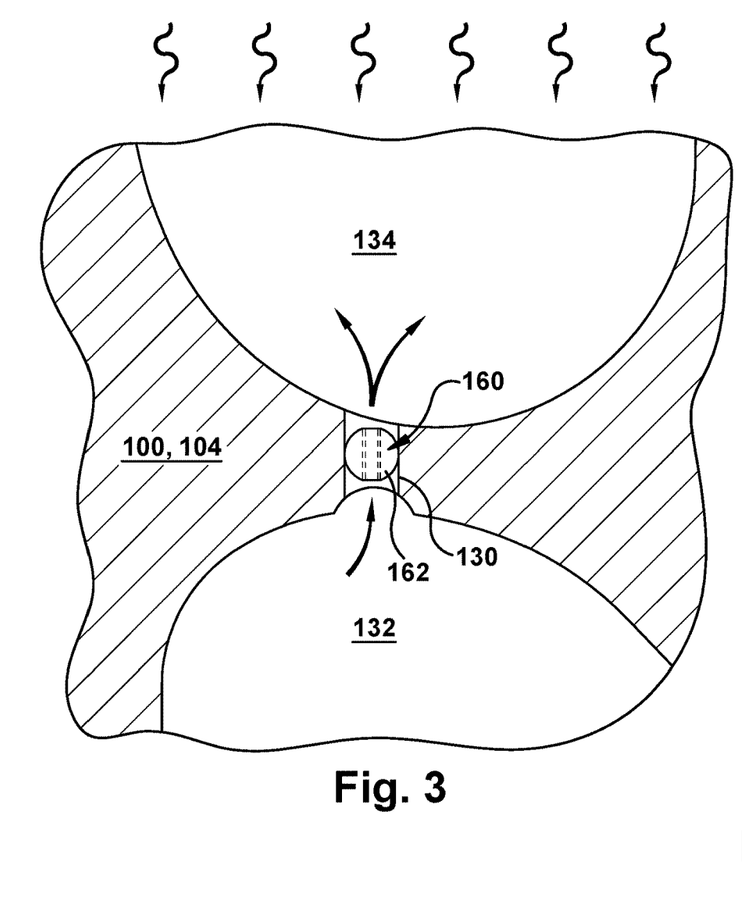
FIG. 3 shows an enlarged cross-sectional view of a turbine component with a PSP ball in a ball-chute, according to embodiments of the disclosure.

FIG. 2 shows a cross-sectional view of a turbine component 100 in the form of a turbine blade 102 including a ball-chute 130 between two cooling passages 132, 134 and a ball 160 therein, according to embodiments of the disclosure. FIG. 3 shows an enlarged cross-sectional view of ball 160 in ball-chute 130, according to embodiments of the disclosure. Turbine blade 102 in FIG. 2 is similarly arranged to that in FIG. 1, but it will be recognized that cooling passages 132, 134 can take a large variety of different forms. Turbine blade 102 may include similar features as turbine blade 12 (FIG. 1) such as but not limited to an airfoil portion 110, a shank 112 and a plurality of radially extending cooling passages 134 that are supplied with a coolant, e.g., cooling air, by way of, for example, inlet cooling passages 132 that are separated in a radially inner portion of shank 112. Turbine component 100 may include, for example, a stage 1 turbine blade 102 of, for example, a 7HA.03 model gas turbine available from General Electric Co., Schenectady, N.Y. It is emphasized that the teachings of the disclosure are applicable to any turbine component 100 having cooling passages 132, 134 therein, including dust holes found in tip pre-sintered preforms, or racetracks in slashfaces. Cooling passages 132, 134 may be any cooling passages in any turbine component 100 in which ball-chutes 130 are desirable. To this end, turbine component 100 may include a component body 104 having ball-chute 130 therein which fluidly couples cooling passages 132, 134. While shown as turbine blade 102, component body 104 can be part of any turbine component 100. Component body 104 may include any material capable of withstanding operation in a turbine system, e.g., a gas turbine, steam turbine, jet engine, compressor, etc.

Figure 4:
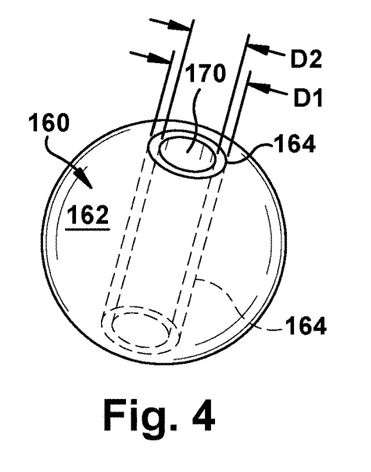
FIG. 4 shows a perspective view of a PSP ball including a hollow member in an opening therein, according to embodiments of the disclosure.
Figure 5:
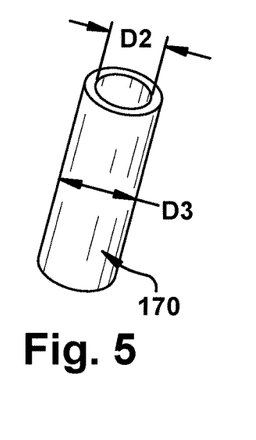
FIG. 5 shows a perspective view of a hollow member for a PSP ball, according to embodiments of the disclosure.
Figure 6:
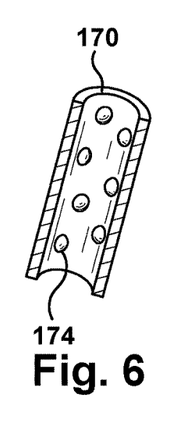
FIG. 6 shows a cross-sectional view of a hollow member, according to other embodiments of the disclosure.
Figure 7:
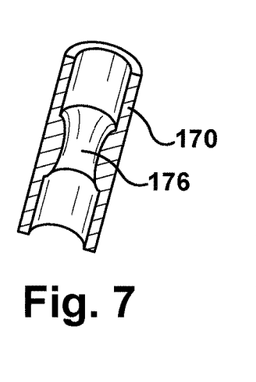
FIG. 7 shows a cross-sectional view of a hollow member, according to yet other embodiments of the disclosure.

FIG. 4 shows a perspective view of a ball 160; and FIG. 5 shows a perspective view of a hollow member 170 for positioning in an opening 164 in ball 160. Referring to FIGS. 3-7, ball 160 includes a ball body 162 made of a pre-sintered preform (PSP) material. PSP materials include a blend of superalloy and braze powders that allow selective build-up of surfaces to be created quickly with a brazing process. PSP materials may include any now known or later developed material appropriate for the application in which used, i.e., customized for the component in which used. Ball body 162 may have a generally spherical shape with perhaps some minor deformities as would be expected for balls 160 made of PSP materials. Ball body 162 includes an opening 164 defined therethrough having a first cross-sectional area A1. As shown in the cross-sectional view of FIG. 9, opening 164 may be formed by any now known or later developed technique, e.g., drilling, electric discharge machining, etc. Where opening 164 is (pre-) drilled, first cross-sectional area A1 may be determined by diameter D1 of opening 164, i.e., $A1=\pi(D1/2)^2$. Where opening 164 is not circular, first cross-sectional area A1 can be calculated in any manner.

Ball 160 also includes a hollow member 170 fixed within opening 164 defined through ball body 162. Hollow member 170 has a second cross-sectional area A2 smaller than first cross-sectional area A1 of opening 164. Second cross-sectional area A2 may be selected to provide any desired coolant flow, e.g., rate, volume, etc., between passages 132, 134. Hollow member 170 may have any desired internal cross-sectional shape, e.g., circular, oval, polygonal, etc. As shown in the cross-sectional view of FIG. 6, hollow member 170 may include any variety of turbulators 174 therein. As shown in the cross-sectional view of FIG. 7, hollow member 170 may include any variety of metering elements 176 to control a coolant flow therethrough. In one example, shown in FIG. 4, hollow member 170 may have a circular internal cross-sectional shape with a diameter D2. Where hollow member 170 has a circular internal cross-sectional shape having diameter D2, second cross-sectional area A2 may be determined by diameter D2, i.e., $A1=\pi(D2/2)^2$. Where hollow member 170 is not circular, second cross-sectional area A2 can be calculated in any manner.

Hollow member 170 is made of a material having a melt temperature higher than a melt temperature of the PSP material. In one embodiment, hollow member 170 may be made of any material capable of not losing shape during the brazing of ball 160, and during operation of turbine component 100. In one example, hollow member 170 may be made of only superalloy such as Hastelloy X, Inconel, Rene alloys, but with the ability to select custom materials based on the end use of the component. In this manner, when ball 160 is brazed into place in ball-chute 130, ball 160 retains fluid communication between passages 132, 134 via hollow member 170. Hollow member 170 is not impacted by the brazing process. As noted, coolant flow allowed between passages 132, 134 by ball 160 is metered based on second cross-sectional area A2 of hollow member 170.

Hollow member 170 may be fixed in opening 164 in any manner. In one option, hollow member 170 may have an exterior cross-sectional shape and size, e.g., diameter D3 (FIG. 5), configured to interference fit with internal surface of opening 164. Hollow member 170 can be forced into the internal surface of opening 164, for example, along its length to create the interference fit. In another option, hollow member 170 may have an exterior cross-sectional shape and size, e.g., diameter D3 (FIG. 5), configured to freely slide into internal surface of opening 164, and hollow member 170 may be expanded radially outwardly into an interference fit with the internal surface of opening 164, e.g., by any mechanism capable of radially expanding hollow member 170. In another option, shown in the cross-sectional view of FIG. 8, hollow member 170 may include a flange 172 extending (radially) from at least one end thereof (both shown). Each flange 172 may engage with an end 177 of opening 164 to fix hollow member 170 in opening 164. Flanges 172 can be formed on hollow member 170, for example, by expanding ends 175 thereof radially outwardly into a tight fit with end(s) 177 of opening 164, e.g., by any mechanism capable of radially expanding hollow member 170. Alternatively, flanges 172 may be coupled to hollow member 170 using any appropriate joining technique, e.g., welding, brazing, soldering. In another option, hollow member 170 may fixed in opening 164 by any appropriate joining technique, e.g., welding, brazing, soldering.

Embodiments of the disclosure also include turbine component 100 including ball 160. As shown in FIGS. 2-3, turbine component 100 may include component body 104 having ball-chute 130 therein. Ball 160 is positioned in ball-chute 130. Ball 160 includes ball body 162 brazed into position in ball-chute 130. Ball body 162 is made of PSP material, as described herein. Ball body 162 has opening 164 defined therethrough having first cross-sectional area A1. Hollow member 170 is fixed within opening 164 defined through ball body 162. Hollow member 170 has second cross-sectional area A2 smaller than first cross-sectional area A1 of opening 164. Hollow member 170 is made of a material having a melt temperature higher than a melt temperature of the PSP material. Hollow member 170 can include the material listed herein, and can be fixed in opening 164, as described herein.

Figure 8:
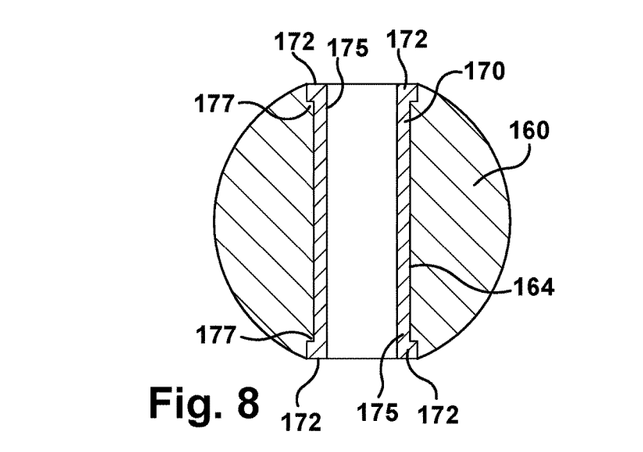
FIG. 8 shows a cross-sectional view of a PSP ball including a hollow member in an opening therein, according to other embodiments of the disclosure.
Figure 9:
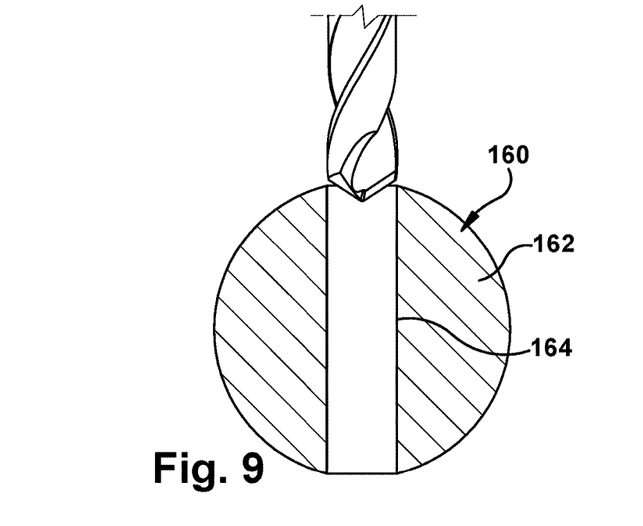
FIG. 9 shows a cross-sectional view of forming an opening in a PSP ball for a hollow member, according to embodiments of the disclosure.

With reference to FIG. 3, and the cross-sectional views of FIGS. 9 and 10, a method according to embodiments of the disclosure will now be described. Embodiments of the method may include forming opening 164 in ball 160. FIG. 9 shows a cross-sectional view of forming opening 164 in ball body 162. Opening 164 may be formed by any now known or later developed technique, e.g., drilling, electric discharge machining, etc. FIGS. 4 and 8 show fixing hollow member 170 in opening 164. Hollow member 170 may be fixed in opening 164 in any manner described herein.

Figure 10:
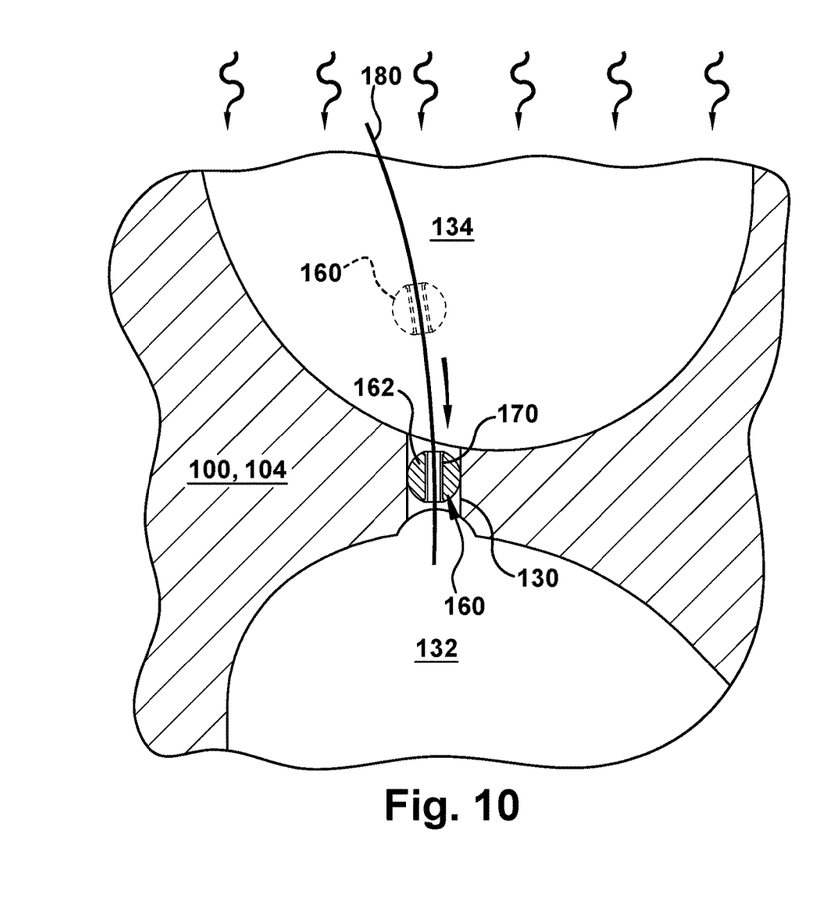
FIG. 10 shows an enlarged cross-sectional view of positioning a PSP ball including a hollow member in a ball-chute, according to embodiments of the disclosure.

FIGS. 3 and 10 show positioning ball 160 in ball-chute 130 in turbine component 100. In one option, as shown in FIG. 3, ball 160 may be positioned in ball-chute using any now known process such as simply dropping ball 160 into passage 132, and allowing it to fall by gravity into ball-chute 130. In another embodiment, shown in FIG. 10, positioning ball 160 in ball-chute 130 may include feeding ball 160 along an elongated member 180 extending through hollow member 170 and into ball-chute 130. Ball 160 slides along elongated member 180, which positions ball 160 and hollow member 170 in ball-chute 130 to maintain fluid communication through hollow member 170 and through ball-chute 130 after the brazing. Elongated member 180 may include any structure capable of being positioned in passage(s) 132, 134 and/or ball-chute 130 in a manner at which a distal end thereof can position ball 160 in ball-chute 130. For example, elongated member 180 may include a wire, a thread/rope, or other flexible elongated member. Elongated member 180 may extend above or into ball-chute 130. While shown in a generally linear arrangement, elongated member 180 can be routed through any variety of turns in passage(s) 132, 134.

The method may also include brazing ball body 162 of ball 160 in ball-chute 130 (curved arrows in FIGS. 3 and 8). Hollow member 170 maintains fluid communication through ball 160 after the brazing. In this manner, coolant flow between passages 132, 134 can be provided even though the location of ball 160 in ball-chute 130 is not accessible, e.g., for drilling of ball 160. Since hollow member 170 is made of a material having a higher melt temperature than the PSP material, and a higher melt temperature than that of the brazing process and the operating temperature of turbine component 100, hollow member 170 will maintain fluid communication between passages 132, 134. Hollow member 170 can be sized to have second cross-sectional area A2 provide any desired flow characteristics. Any desired turbulators 174 (FIG. 6) and/or metering elements 176 can be provided in hollow member 170.

Embodiments of the disclosure reduce larger ball-chute 130 while embedding a smaller passage (in hollow member 170) in the PSP material, preventing the quality issues from using traditional hole drilling operations. More particularly, the hollow member allows the ball to be brazed into place in a ball-chute in a turbine component, yet continue fluid communication through the ball chute with the coolant flow metered by the cross-sectional area of the hollow member. The hollow member also allows customized metering of the coolant flow therethrough.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. "Approximately," as applied to a particular value of a range, applies to both end values and, unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application and to enable others of ordinary skill in the art to understand the disclosure for various embodiments with various modifications as are suited to the particular use contemplated.

What is claimed is:

1. A ball for a ball-chute in a turbine component, the ball comprising:
   a ball body made of a pre-sintered preform (PSP) material, the ball body having an opening defined therethrough having a first cross-sectional area; and
   a hollow member fixed within the opening defined through the ball body, the hollow member having a second cross-sectional area smaller than the first cross-sectional area of the opening,
   wherein the hollow member is made of a material having a melt temperature higher than a melt temperature of the PSP material.

2. The ball of claim 1, wherein the hollow member includes a flange extending from at least one end thereof, each flange engaging with an end of the opening to fix the hollow member in the opening.

3. The ball of claim 1, wherein the material of the hollow member consists of a superalloy.

4. A turbine component, comprising:
   a component body having a ball-chute therein; and
   a ball positioned in the ball-chute, the ball including:
      a ball body brazed into position in the ball-chute, the ball body made of a pre-sintered preform (PSP) material, the ball body having an opening defined therethrough having a first cross-sectional area; and
      a hollow member fixed within the opening defined through the ball body, the hollow member having a second cross-sectional area smaller than the first cross-sectional area of the opening,
   wherein the hollow member is made of a material having a melt temperature higher than a melt temperature of the PSP material.

5. The turbine component of claim 4, wherein the hollow member includes a flange extending from at least one end thereof, each flange engaging with an end of the opening to fix the hollow member in the opening.

6. The turbine component of claim 4, wherein the material of the hollow member consists of a superalloy.

7. The turbine component of claim 4, wherein the component body includes a turbine blade airfoil.

8. The turbine component of claim 7, wherein the turbine blade airfoil is in a first stage of a turbine.

9. A method comprising:
   positioning a ball in a ball-chute in a turbine component, the ball including:
      a ball body made of a pre-sintered preform (PSP) material having an outer dimension configured to position the ball body in the ball-chute, the ball body having an opening defined therethrough, the opening having a first cross-sectional area; and
      a hollow member fixed within the opening of the ball body, the hollow member having a second cross-sectional area smaller than the first cross-sectional area of the opening; and
   brazing the ball body of the ball in the ball-chute, wherein the hollow member maintains fluid communication through the ball after the brazing.

10. The method of claim 9, wherein the hollow member includes a flange extending from at least one end thereof, each flange engaging with an end of the opening to fix the hollow member in the opening.

11. The method of claim 9, wherein the hollow member is made of a different material than the PSP material.

12. The method of claim 9, wherein the material of the hollow member has a melt temperature higher than a melt temperature of the PSP material.

13. The method of claim 9, wherein the material of the hollow member consists of a superalloy.

14. The method of claim 9, further comprising:
   forming the opening in the ball body; and
   fixing the hollow member in the opening.

15. The method of claim 14, wherein the fixing the hollow member includes forming a flange extending from at least one end thereof, each flange engaging with an end of the opening to fix the hollow member in the opening.

16. The method of claim 14, wherein the fixing the hollow member includes expanding the hollow member to engage with an inner surface of the opening in an interference fit.

17. The method of claim 9, wherein the positioning the ball in the ball-chute includes feeding the ball along an elongated member extending through the hollow member and into the ball-chute, the elongated member positioning the ball and the hollow member to maintain fluid communication through the hollow member and along the ball-chute after the brazing.

* * * * *